(12) United States Patent
Hatano et al.

(10) Patent No.: US 11,608,133 B2
(45) Date of Patent: Mar. 21, 2023

(54) SEAT RAIL STRUCTURE FOR MOTORCYCLE

(71) Applicant: Suzuki Motor Corporation, Hamamatsu (JP)

(72) Inventors: Daisuke Hatano, Hamamatsu (JP); Kyohei Ikoma, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 239 days.

(21) Appl. No.: 17/065,587

(22) Filed: Oct. 8, 2020

(65) Prior Publication Data
US 2021/0147025 A1    May 20, 2021

(30) Foreign Application Priority Data
Nov. 15, 2019 (JP) .............................. JP2019-207159

(51) Int. Cl.
*B62K 11/02* (2006.01)
*B62J 35/00* (2006.01)
*B62J 1/08* (2006.01)

(52) U.S. Cl.
CPC ................. *B62J 1/08* (2013.01); *B62K 11/02* (2013.01); *B62J 35/00* (2013.01)

(58) Field of Classification Search
CPC ............. B62J 1/08; B62J 35/00; B62K 11/02; B62K 11/04
See application file for complete search history.

(56) References Cited

U.S. PATENT DOCUMENTS

| 9,902,458 | B2 | 2/2018 | Matsushima | |
| 10,710,665 | B2 * | 7/2020 | Matsuo | B62K 11/04 |

| 2016/0200387 | A1 | 7/2016 | Matsushima | |
| 2018/0072368 | A1 * | 3/2018 | Matsuo | B62J 1/08 |
| 2018/0339739 | A1 * | 11/2018 | Kondo | B62J 25/06 |

FOREIGN PATENT DOCUMENTS

| AT | 517927 A1 | 5/2017 | |
| JP | H07215256 A * | 8/1985 | |
| JP | H07215256 A | 8/1995 | |
| JP | 201839484 A | 3/2018 | |
| WO | 2015033425 A1 | 3/2015 | |
| WO | WO-2015033425 A1 * | 3/2015 | B62J 40/00 |

OTHER PUBLICATIONS

Office Action for German Application No. 102020123194.6, dated Nov. 16, 2021. 7 pgs.

* cited by examiner

*Primary Examiner* — Jacob B Meyer
*Assistant Examiner* — Ryan Edward Hardy
(74) *Attorney, Agent, or Firm* — Lerner, David, Littenberg, Krumholz & Mentlik, LLP

(57) ABSTRACT

In a seat rail structure according to the present invention, a seat rail of a vehicle body of a motorcycle has a side wall positioned lateralward in a width direction of the vehicle body, and the side wall has a bulge portion formed at a front upper region positioned frontward in the vehicle body and upward in the vehicle body. The bulge portion bulges outward in the width direction of the vehicle body relative to a peripheral portion positioned at surroundings of the bulge portion, and the seat rail has a front flange positioned at an upper end of the side wall and protrudes inward in the width direction of the vehicle body from an upper end of the bulge portion.

8 Claims, 4 Drawing Sheets

SEAT RAIL STRUCTURE FOR MOTORCYCLE

CROSS-REFERENCE TO RELATED APPLICATIONS

The present application claims priority from Japanese Patent Application No. 2019-207159 filed Nov. 15, 2019, the disclosure of which is hereby incorporated herein by reference.

BACKGROUND OF THE INVENTION

The present invention relates to a seat rail structure to be disposed on a motorcycle, that is, a seat rail structure for a motorcycle.

Typically, a seat rail to be disposed on a motorcycle may play a role of supporting a seat, a fuel tank, and/or the like. It is requested for such a seat rail to increase the strength for supporting the seat, the fuel tank, and/or the like. Accordingly, to satisfy this request, various seat rail structures, that is, various seat rail structures for a motorcycle, have been suggested.

In a structure cited as one example of the seat rail structure for a motorcycle, a rear frame (a seat rail) is made of fiber reinforced resin, and furthermore, the rear frame has: a right and left pair of side walls; and an upper cross member which is separately formed from these side walls and connects upper end portions of the pair of side walls. Each side wall is formed in a curved shape so as to be recessed from an outer side to an inner side in a width direction of a vehicle body, and an interval, in the width direction of the vehicle body, between the pair of side walls is increased from an upper side of the vehicle body toward a lower side of the vehicle body (for example, see WO 2015/033425 A1).

BRIEF SUMMARY OF THE INVENTION

Typically, when a rider, a pillion rider, baggage, and/or the like are/is mounted on the motorcycle, a load is applied from the upper side of the vehicle body on the upper end portions of the pair of side walls in the seat rail (the rear frame). However, in the example of the seat rail structure for the motorcycle, the interval between the pair of side walls is increased from the upper side of the vehicle body toward the lower side of the vehicle body. Consequently, due to such load, the pair of side walls is easily deformed from the outer side toward the inner side in the width direction of the vehicle body. Furthermore, when these side walls are deformed, due to compression in the width direction of the vehicle body, the upper cross member is easily deformed to be bent in an upper-lower direction of the vehicle body. Consequently, in the example of the seat rail structure for a motorcycle, there is room for improvement in the view of improving the strength of the seat rail.

Furthermore, in an inner space of the seat rail formed between the pair of side walls, electrical components, such as a battery, a cable, and the like are disposed. Consequently, in the example of the seat rail structure for the motorcycle, it has been desired to efficiently increase the inner space of the seat rail.

In view of such circumstances, in the seat rail structure for the motorcycle, it is desired that the strength of the seat rail be efficiently improved, and the inner space of the seat rail for disposing electrical components, such as a battery, a cable, and the like is efficiently increased.

To solve the problems, a seat rail structure for a motorcycle according to one aspect includes a seat rail disposed on a vehicle body of the motorcycle, wherein the seat rail has a side wall positioned lateralward in a width direction of the vehicle body, the side wall has a bulge portion formed at a front upper region positioned at a front side of the vehicle body and an upper side of the vehicle body, the bulge portion bulges outward in the width direction of the vehicle body relative to a peripheral portion positioned at surroundings of the bulge portion, and the seat rail has a front flange positioned at an upper end, in an upper-lower direction of the vehicle body, of the side wall, the front flange protruding inward in the width direction of the vehicle body from an upper end, in the upper-lower direction of the vehicle body, of the bulge portion.

In the seat rail structure for a motorcycle according to one aspect, the strength of the seat rail can be efficiently improved, and the inner space of the seat rail for disposing the electrical components, such as the battery, the cable, and the like can be efficiently increased.

DETAILED DESCRIPTION

A seat rail structure for a motorcycle according to one Embodiment will be described below together with the motorcycle to which it is applied. Here, the motorcycle to which the seat rail structure for the motorcycle (hereinafter, this is merely referred to as "a seat rail structure" as necessary) is applied, includes one front wheel and one rear wheel, typically. However, the motorcycle may include two front wheels and one rear wheel.

Figure 1:
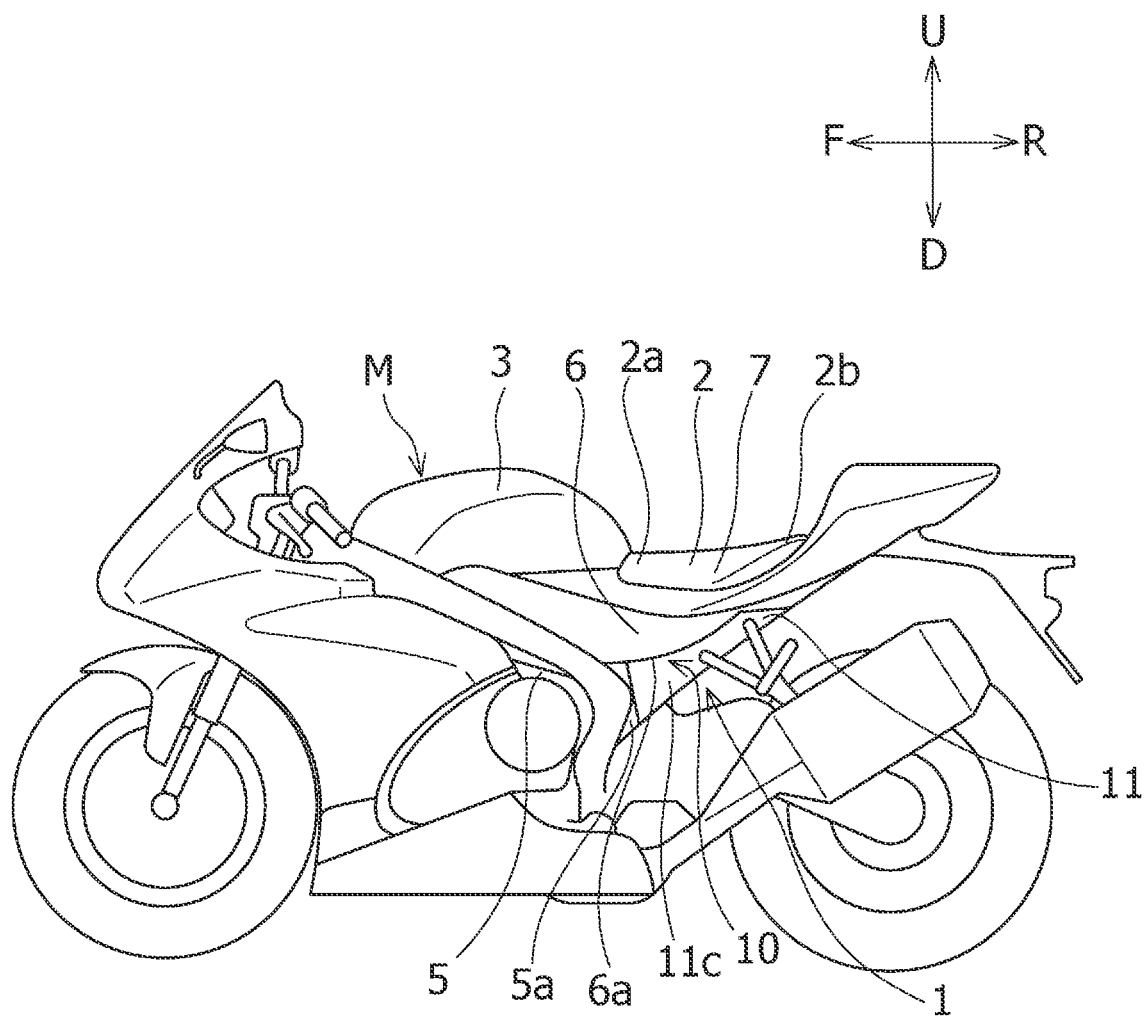
FIG. 1 is a side view schematically showing a motorcycle having a seat rail structure according to one Embodiment.
Figure 2:
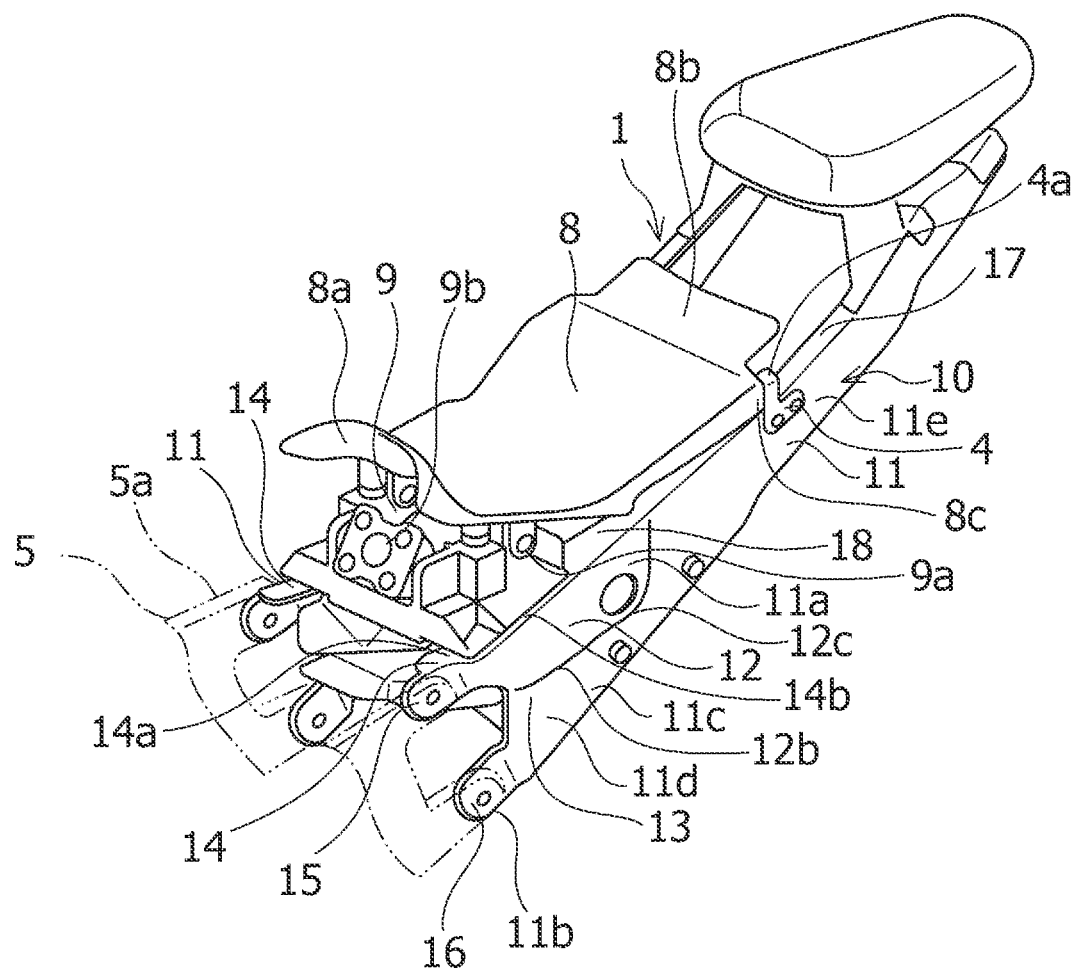
FIG. 2 is a perspective view schematically showing a seat rail and its peripheral part of the seat rail structure according to the Embodiment.
Figure 3:
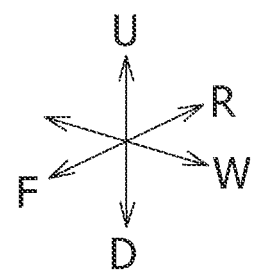
FIG. 3 is a perspective view schematically showing the seat rail of the seat rail structure according to the Embodiment.
Figure 3:
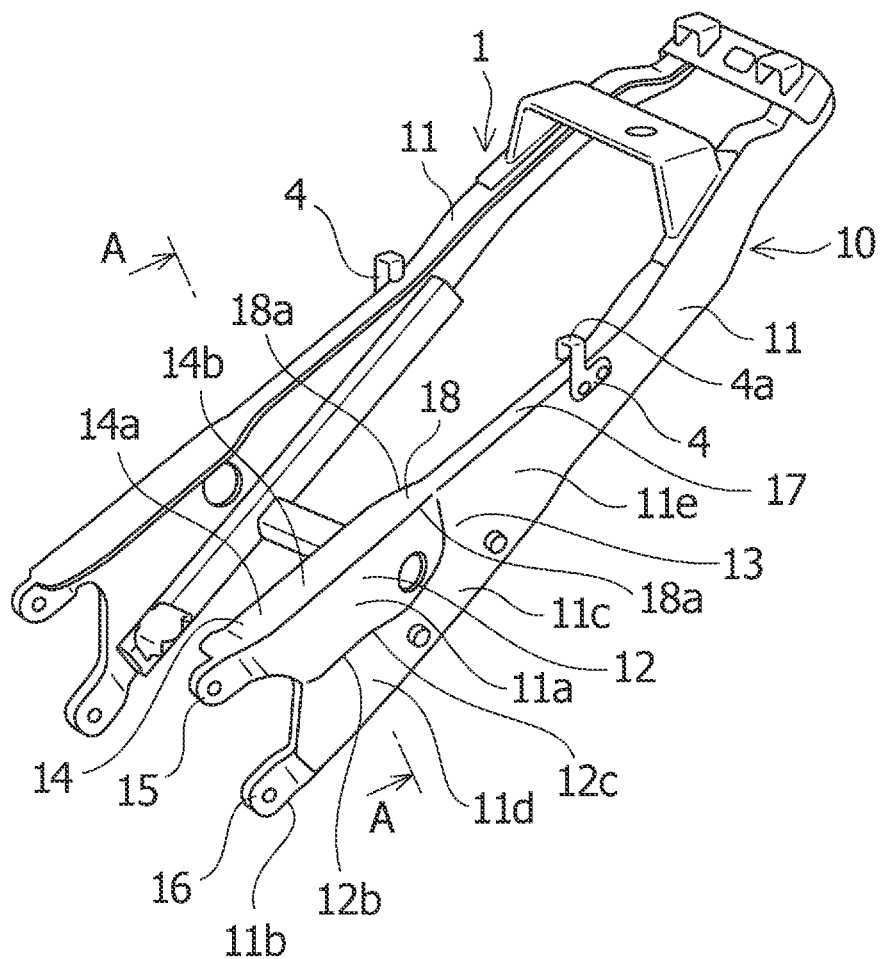
Figure 4:
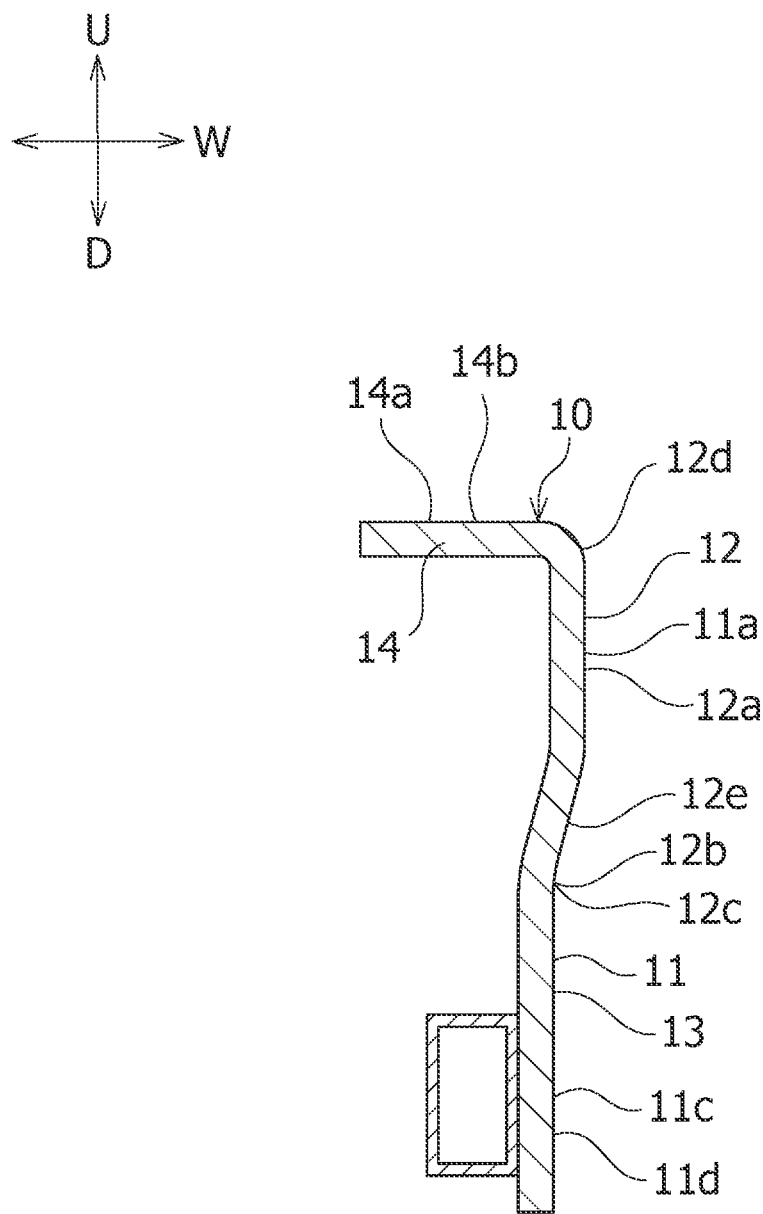
FIG. 4 is a cross-sectional view taken along the line A-A of FIG. 3.

In this Embodiment, in FIGS. 1 to 3, a front side of a vehicle body M of the motorcycle (hereinafter, this is merely referred to as "a front side" as necessary) is shown by a single-headed arrow F, and a rear side of the vehicle body M (hereinafter, this is merely referred to as "a rear side" as necessary) is shown by a single-headed arrow R. Consequently, a front-rear direction of the vehicle body M (hereinafter, this is merely referred to as "a front-rear direction" as necessary) is shown by the single-headed arrow F and the single-headed arrow R. In FIGS. 2 to 4, a width direction of the vehicle body M (hereinafter, this is merely referred to as "a width direction" as necessary) is shown by a double-headed arrow W. In FIGS. 1 to 4, an upper side of the vehicle body M (hereinafter, this is merely referred to as "an upper side" as necessary) is shown by a single-headed arrow U, and a lower side of the vehicle body M (hereinafter, this is merely referred to as "a lower side" as necessary) is shown by a single-headed arrow D. An upper-lower direction of the vehicle body M (hereinafter, this is merely referred to as "an upper-lower direction" as necessary) is shown by the single-headed arrow U and the single-headed arrow D.

With reference to FIGS. 1 to 4, the outline of a seat rail structure 1 and a motorcycle according to this Embodiment will be described. In other words, the seat rail structure 1 and the motorcycle are schematically configured as follows. As shown in FIG. 1, the seat rail structure 1 is applied to the motorcycle. As shown in FIGS. 1 to 4, the seat rail structure 1 has a seat rail 10 disposed on a vehicle body M of the motorcycle.

As shown in FIGS. 2 and 3, the seat rail 10 has two side walls 11 which are respectively positioned at both sides in a width direction. The two side walls 11 are disposed so as to be spaced apart from each other in the width direction. The seat rail structure 1 according to this Embodiment is configured such that each of the two side walls 11 has components which will be described in detail below. The components in the two side walls 11 are substantially symmetrical in the width direction. However, the seat rail may be configured such that only one of the two side walls has the following components. Based on this, hereinafter, it is assumed that components of one of the two side walls 11 are typically described unless the two side walls 11 and components related to the two side walls 11, are described specifically.

As shown in FIGS. 2 and 3, the side wall 11 has a bulge portion 12 formed at a front upper region 11a which is positioned at a front side and an upper side of the side wall 11. The bulge portion 12 bulges toward an outer side in the width direction relative to a peripheral portion 13 positioned at its surroundings. As shown in FIGS. 3 and 4, the seat rail 10 has a front flange 14 positioned at an upper end in an upper-lower direction of the side wall 11. The front flange 14 protrudes toward an inner side in the width direction from an upper end, in the upper-lower direction, of the bulge portion 12.

Furthermore, the seat rail structure 1 and the motorcycle can be schematically configured as follows. As shown in FIG. 1, the vehicle body M of the motorcycle has a seat 2 and a fuel tank 3. An upper surface 14a, in the upper-lower direction, of the front flange 14 includes an attachment bearing surface 14b used for attachment of the seat 2 and the fuel tank 3. As shown in FIG. 2, such front flange 14 supports a front-end portion 2a, in a front-rear direction, of the seat 2. At the upper end of the side wall 11, a seat engaging member 4 to be engaged with a rear end portion 2b, in the front-rear direction, of the seat 2, is disposed. A rear end, in the front-rear direction, of the bulge portion 12 is disposed at the front side relative to the seat engaging member 4.

As shown in FIGS. 1 and 2, the vehicle body M has a main frame 5 (in FIG. 2, this is shown by phantom lines). As shown in FIGS. 2 and 3, a front-end region 11b, in the front-rear direction, of the side wall 11 has an upper attachment portion 15 configured so as to be attached to the main frame 5. The upper attachment portion 15 is positioned at the upper side of the front-end region 11b. A lower end, in the upper-lower direction, of the bulge portion 12 is disposed at a lower side relative to an upper end, in the upper-lower direction, of the upper attachment portion 15. Furthermore, the front-end region 11b of the side wall 11 has a lower attachment portion 16 configured so as to be attached to the main frame 5. The lower attachment portion 16 is positioned at the lower side relative to the front-end region 11b. The lower end of the bulge portion 12 is disposed at the upper side relative to an upper end, in the upper-lower direction, of the lower attachment portion 16. A front end, in the front-rear direction, of the bulge portion 12 is also disposed at a rear side relative to the upper attachment portion 15.

As shown in FIG. 1, the vehicle body M has an outer panel 6. The outer panel 6 covers the bulge portion 12 from the outer side in the width direction of the vehicle body M. As shown in FIGS. 1 to 4, the side wall 11 has an exposed portion 11c which is exposed to an outer portion of the vehicle body M when seen from the outer side in the width direction of the vehicle body M. The exposed portion 11c is adjacent to the bulge portion 12 and the outer panel 6 toward the lower side.

As shown in FIGS. 2 and 3, the seat rail 10 has a rear flange 17 positioned at the upper end of the side wall 11 and the rear side relative to the front flange 14. The seat rail 10 also has a transitional flange 18 which connects the front flange 14 and the rear flange 17. The length, in the width direction, of the front flange 14 is greater than the length, in the width direction, of the rear flange 17. Both side edges 18a, in the width direction, of the transitional flange 18 are formed such that an interval, in the width direction, of the both side edges 18a is increased from the rear flange 17 toward the front flange 14.

The bulge portion 12 has an outermost section 12a positioned at an outermost therein in the width direction. The outermost section 12a is positioned at the lower side relative to the front flange 14. Furthermore, the side wall 11 has a border edge 12b formed at the lower side from the upper end of the side wall 11 and between the bulge portion 12 and the peripheral portion 13 of the bulge portion 12. A corner portion formed at the border edge 12b, extends to be substantially arcuate. Additionally, the border edge 12b does not include the border edge between the bulge portion 12 and the front flange 14.

With reference to FIGS. 1 and 2, the details of the motorcycle will be described. In other words, the motorcycle can be configured in detail as follows. As shown in FIG. 1, the seat 2 of the motorcycle is positioned at the upper side relative to the seat rail 10. The seat 2 has a seat cushion 7 configured such that at least a rider can be seated.

As shown in FIG. 2, the seat 2 also has a seat base 8 positioned at the lower side relative to the seat cushion 7. The seat base 8 supports the seat cushion 7 from the lower side. A front-end portion 8a and a rear end portion 8b, in the front-rear direction, of the seat base 8 are respectively provided to a front-end portion 2a and a rear end portion 2b of the seat 2. The front-end portion 8a of the seat base 8 is attached to the attachment bearing surface 14b of the upper surface 14a of the front flange 14 via a bracket 9 positioned at the lower side of the front-end portion 8a.

The bracket 9 has a seat attachment portion 9a configured such that the front-end portion 2a of the seat 2, in particular, the front-end portion 8a of the seat base 8 can be attached. In a case in which two seat engaging members 4 are respectively disposed at the upper ends of two side walls 11, the rear end portion 8b of the seat base 8 has two engaged portions 8c configured to be respectively engageable with these two seat engaging members 4. The seat engaging member 4 has an engaging portion 4a configured to be engageable with the engaged portion 8c. The engaging portion 4a is disposed upward of the rear flange 17.

As shown in FIG. 1, the fuel tank 3 of the motorcycle is positioned at the upper side relative to the main frame 5. The main frame 5 supports the fuel tank 3 from the lower side. Furthermore, the fuel tank 3 is positioned at the front side relative to the seat 2. The fuel tank 3 is adjacent to the seat 2 in the front-rear direction. Although not shown clearly, the fuel tank 3 is also attached to the attachment bearing surface 14b of the upper surface 14a of the front flange 14 via the bracket 9. As shown in FIG. 2, the bracket 9 has a tank attachment portion 9b configured such that the fuel tank 3 is attachable. The tank attachment portion 9b is positioned at the front side relative to the seat attachment portion 9a.

As shown in FIGS. 1 and 2, the main frame 5 of the motorcycle (this is shown by phantom lines in FIG. 2) is positioned at the front side relative to the seat rail 10. The main frame 5 is also adjacent to the seat rail 10 in the front-rear direction. As shown in FIG. 2, a rear end region 5a, in the front-rear direction, of the main frame 5 is attached to the upper attachment portion 15 and the lower attachment portion 16 of the front-end region 11b of the side wall 11 in the seat rail 10. Although not shown clearly, the attachment of the main frame 5 and the seat rail 10 is by fastening due to a fastening means using a bolt and a nut. However, the fastening means is not limited to a bolt and a nut. The attachment of the main frame and the seat rail may be caused by attachment means other than the fastening means.

As shown in FIG. 1, the outer panel 6 is positioned at the lower side relative to the seat 2. A lower end edge 6a in the upper-lower direction of the outer panel 6 is disposed partially along a lower end edge 12c, in the upper-lower direction, of the bulge portion 12. Additionally, the lower end edge 12c of the bulge portion 12 is a part of the border edge 12b of the bulge portion 12.

With reference to FIGS. 1 to 4, the details of the seat rail structure 1 will be described. In other words, the seat rail structure 1 can be configured in detail as follows. The seat rail 10 is configured using fiber reinforced resin. However, the seat rail 10 may be configured using materials such as resin other than fiber reinforced resin, metal, and/or the like.

As shown in FIGS. 2 and 3, in the seat rail structure 1, the side wall 11 has a front lower region 11d which is adjacent to the front upper region 11a toward the lower side. The front-end region 11b of the side wall 11 is adjacent to the front upper region 11a and the front lower region 11d toward the front side. The side wall 11 also has a rear region 11e which is adjacent to the front upper region 11a and the front lower region 11d toward the rear side.

The lengths, in the front-rear direction, of the front upper region 11a and the front lower region 11d are less than the length, in the front-rear direction, of the rear region 11e. A rear end of the bulge portion 12 is positioned rearward of the center, in the front-rear direction, of the seat 2. As shown in FIGS. 3 and 4, the lower end of the bulge portion 12 is positioned lower than the center, in the upper-lower direction, of the side wall 11. However, the rear end of the bulge portion may substantially correspond to the center, in the front-rear direction, of the seat, or may be positioned frontward of the center, in the front-rear direction, of the seat. The lower end of the bulge portion may also substantially correspond to the center, in the upper-lower direction, of the side wall, or may be positioned higher than the center, in the upper-lower direction, of the side wall.

As shown in FIGS. 2 and 3, the border edge 12b of the bulge portion 12 smoothly extends not to include a sharp corner portion. The border edge 12b may be formed, in particular, only by an arcuate portion or only by an arcuate portion and a substantially linear portion. The lower end edge 12c of the bulge portion 12 is positioned between the front upper region 11a or the bulge portion 12, and the front lower region 11d.

As shown in FIG. 4, the bulge portion 12 has an upper transitional section 12d which extends between the upper end of the bulge portion 12 and the outermost section 12a. The bulge portion 12 also has a lower transitional section 12e which extends between the lower end of the bulge portion 12 and the outermost section 12a. In FIG. 4, in a sectional view cutting along the width direction and the upper-lower direction, the outermost section 12a is formed to be substantially linear. The upper transitional section 12d is formed to be substantially arcuate. The lower transitional section 12e is formed to be substantially linear.

However, the outermost section, the upper transitional section, and the lower transitional section of the bulge portion are not limited to this. For example, in a sectional view cutting along the width direction and the upper-lower direction, the outermost section may be formed in a substantially wedge shape, a substantially arc shape, or the like. The upper transitional section may be formed in a substantially linear shape, a substantially wedge shape, or the like. The lower transitional section may be formed in a substantially arc shape, a substantially wedge shape, or the like.

The peripheral portion 13 of the bulge portion 12 is disposed so as to straddle the front-end region 11b, the front lower region 11d, and the rear region 11e. The attachment bearing surface 14b of the front flange 14 is positioned at the front side with a standard of the center, in the front-rear direction, of the upper surface 14a of the front flange 14.

The upper attachment portion 15 of the front-end region 11b protrudes toward the front side from the front upper region 11a. The lower attachment portion 16 of the front-end region 11b protrudes toward the front side from the front lower region 11d which is adjacent to the front upper region 11a toward the lower side. The upper attachment portion 15 and the lower attachment portion 16 are spaced in the upper-lower direction.

As shown in FIGS. 2 and 3, the front flange 14 is positioned at an upper end, in the upper-lower direction, of the front upper region 11a of the side wall 11. The rear flange 17 is positioned at an upper end, in the upper-lower direction, of the rear region 11e which is adjacent to the front upper region 11a and the front lower region 11d in the side wall 11 toward the rear side. The transitional flange 18 is positioned at an upper end of the front upper region 11a, in particular, the upper end of the bulge portion 12. As shown in FIG. 3, the lengths, in the front-rear direction, of the front flange 14 and the rear flange 17 are greater than the length, in the front-rear direction, of the transitional flange 18. The length, in the front-rear direction, of the rear flange 17 is greater than the length, in the front-rear direction, of the front flange 14.

As described above, in the seat rail structure 1 according to this Embodiment, the side wall 11 of the seat rail 10 has the bulge portion 12 formed at the front upper region 11a. This bulge portion 12 bulges toward the outer side in the width direction relative to the peripheral portion 13 positioned at its surroundings. The seat rail 10 also has the front flange 14 positioned at the upper end of the side wall 11 so as to protrude toward the inner side in the width direction from the upper end of the bulge portion 12. In such a seat rail structure 1, the inner space of the seat rail 10 can be enlarged by the bulge portion 12 of the side wall 11, the bulge portion 12 bulging toward the outer side in the width direction. For example, a cable and/or the like can be passed through an inner portion of the bulge portion 12. Consequently, the inner space of the seat rail 10 for disposing electrical components and/or the like can be efficiently enlarged by the bulge portion 12. In a case in which the pillion rider, the baggage, and/or the like are mounted on the motorcycle so that a load is applied from the upper side to a rear portion, in the front-rear direction, of the seat rail 10, the front upper region 11a of the side wall 11 receives a tensile load in the front-rear direction due to such load. In contrast, in the seat rail structure 1 according to this Embodiment, due to the bulge portion 12, the strength of the front upper region 11a to such tensile load can be efficiently improved. Furthermore, in the case in which the rider, the pillion rider, the baggage, and/or the like are mounted on the motorcycle so that a load is applied from the upper side to the upper end of the side wall 11, the side wall 11 tries to be deformed from the inner side toward the outer side in the width direction due to the bulge portion 12. In contrast, in the seat rail structure 1 according to this Embodiment, for example, when a connecting member which connects upper ends of two side walls 11, for example, the bracket 9 and/or the like are/is disposed, at the time of such deformation, a tensile load in the width direction acts on the connecting member, and the connecting member has a sufficient strength for the tensile load. Thus, the strength of the seat rail 10 can be efficiently improved, so that the inner space of the seat rail 10 for disposing the electrical components, such as a battery, the cable, and/or the like can be efficiently increased.

In the seat rail structure 1 according to this Embodiment, the upper surface 14a of the front flange 14 includes the attachment bearing surface 14b used for attachment of the seat 2 and/or the fuel tank 3. In this seat rail structure 1, even when a load is applied from the upper side to the upper surface 14a of the front flange 14 via the seat 2 and/or the fuel tank 3, the load is efficiently transferred to the upper end of the bulge portion 12 of the side wall 11. Consequently, as described above, the strength of the seat rail 10 can be efficiently improved.

In the seat rail structure 1 according to this Embodiment, the front flange 14 supports the front end portion 2a of the seat 2, and at the upper end of the side wall 11, the seat engaging member 4 to be engaged with the rear end portion 2b of the seat 2, is disposed, and furthermore, the rear end of the bulge portion 12 is disposed at the front side relative to the seat engaging member 4. In this seat rail structure 1, a load in the upper-lower direction to be applied to the seat rail 10 via the seat 2 can be dispersed to the front flange 14 positioned at the upper end of the bulge portion 12 and the rear region 11e positioned at the rear side relative to the bulge portion 12. Accordingly, stress concentration caused at the seat rail 10, can be reduced.

In the seat rail structure 1 according to this Embodiment, the front-end region 11b of the side wall 11 has the upper attachment portion 15 configured so as to be attached to the main frame 5 of the vehicle body M, the upper attachment portion 15 positioned at the upper side. The lower end of the bulge portion 12 is disposed lower than the upper end of the upper attachment portion 15. In the seat rail structure 1, due to the upper attachment portion 15 having high rigidity, the bulge portion 12 can be efficiently reinforced. Due to interposition of the upper attachment portion 15, the distance between the upper end and the lower end of the bulge portion 12 is inevitably separated. Consequently, the bulge portion 12 can be formed to be in a gently curved shape, so that stress concentration at the bulge portion 12 can be prevented.

In the seat rail structure 1 according to this Embodiment, the front-end region 11b of the side wall 11 has the lower attachment portion 16 configured so as to be attached to the main frame 5, the lower attachment portion 16 positioned to the lower side. The lower end of the bulge portion 12 is disposed higher than the upper end of the lower attachment portion 16. In this seat rail structure 1, the lower end of the bulge portion 12 is positioned between the upper attachment portion 15 and the lower attachment portion 16 having high rigidity, so that, due to the upper attachment portion 15 and the lower attachment portion 16, a peripheral region at the lower end of the bulge portion 12 can be efficiently reinforced.

In the seat rail structure 1 according to this Embodiment, the outer panel 6 covers the bulge portion 12 from the outer side in the width direction, and the side wall 11 has the exposed portion 11c adjacent to the bulge portion 12 and the outer panel 6 toward the lower side, the exposed portion 11c exposed to the outer portion of the vehicle body M when seen from the outer side in the width direction. In this seat rail structure 1, even when rainwater and/or the like try/tries to intrude from the gap between the lower end edge 6a of the outer panel 6 and the side wall 11 of the seat rail 10, further intrusion of rainwater and/or the like into the inner space of the seat rail 10 in which the electrical components, such as the battery, the cable, and the like are disposed can be efficiently prevented by the bulge portion 12. Furthermore, deterioration of the seat rail 10 caused by the rainwater and/or the like can be prevented, so that strength reduction of the seat rail 10 caused by such deterioration can be prevented. Additionally, the bulge portion 12 can be covered by the outer panel 6, so that deterioration of design property of the seat rail 10 can be prevented.

In the seat rail structure 1 according to this Embodiment, a front end of the bulge portion 12 is disposed at the rear side relative to the upper attachment portion 15. In such seat rail structure 1, while the bulge portion 12 has elasticity to absorb a load, the bulge portion 12 can be reinforced by the upper attachment portion 15 from the surroundings of the bulge portion 12.

In the seat rail structure 1 according to this Embodiment, the seat rail 10 has: the rear flange 17 positioned at the upper end of the side wall 11 and at the rear side to the front flange 14; and the transitional flange 18 connecting the front flange 14 and the rear flange 17. Furthermore, the length, in the width direction, of the front flange 14 is greater than the length, in the width direction, of the rear flange 17, and the both side edges 18a of the transitional flange 18 are formed such that the interval, in the width direction, of the both side edges 18a is increased from the rear flange 17 toward the front flange 14. In such a seat rail structure 1, in particular, in a case in which the pillion rider, the baggage, and/or the like are/is mounted on the motorcycle, stress concentration caused between the front flange 14 and the rear flange 17 due to a load applied to the rear flange 17, can be reduced by the transitional flange 18.

In the seat rail structure 1 according to this Embodiment, the bulge portion 12 has the outermost section 12a positioned at the outermost therein in the width direction, and the outermost section 12a is positioned lower than the front flange 14. In this seat rail structure 1, the bulge portion 12 can be formed to be in the gently curved shape, so that stress concentration at the bulge portion 12 can be prevented. Additionally, the curve generated between the upper end of the bulge portion 12 and the outermost section 12a, and the curve generated between the outermost section 12a and the lower end of the bulge portion 12 are prevented from becoming sharp, so that, even in a case in which the seat rail 10 is manufactured by forming of fiber reinforced resin, the bulge portion 12 can be easily formed.

In the seat rail structure 1 according to this Embodiment, the side wall 11 has the border edge 12b formed at the lower side from the upper end of the side wall 11 and between the bulge portion 12 and the peripheral portion 13 of the bulge portion 12, and the corner portion formed at the border edge 12b, extends to be arcuate. In this seat rail structure 1, when the seat rail 10 is manufactured by forming of fiber reinforced resin, the difference in fluidity of resin generated at a border of the border edge 12b at a periphery of the bulge portion 12, can be reduced. Consequently, undulation and/or the like of fibers can be reduced, so that stress concentration at the periphery of the bulge portion 12 can be reduced.

While the Embodiment of the present invention has been described so far, the present invention is not limited to the above Embodiment, and the present invention can be varied and modified based on its technical concept.

REFERENCE SIGNS LIST

1 . . . Seat rail structure (Seat rail structure for a motorcycle), 2 . . . Seat, 2a . . . Front end portion, 2b . . . Rear end portion, 3 . . . Fuel tank, 4 . . . Seat engaging member, 5 . . . Main frame, 6 . . . Outer panel, 10 . . . Seat rail, 11 . . . Side wall, 11a . . . Front upper region, 11b . . . Front end region, 11c . . . Exposed portion, 12 . . . Bulge portion, 12a . . . Outermost section, 12b . . . Border edge, 13 . . . Peripheral portion, 14 . . . Front flange, 14a . . . Upper surface, 14b Attachment bearing surface, 15 . . . Upper attachment portion, 16 . . . Lower attachment portion, 17 . . . Rear flange, 18 . . . Transitional flange, 18a . . . Side edge, M . . . Vehicle body Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A seat rail structure for a motorcycle, comprising:
a seat rail disposed on a vehicle body of the motorcycle, wherein
the seat rail has two side walls positioned lateralward in a width direction of the vehicle body and a bracket connecting the two side walls;
each of the side walls has a bulge portion formed at a front upper region positioned frontward in the vehicle body and upward in the vehicle body;
the bulge portion bulges outward in the width direction of the vehicle body relative to a peripheral portion positioned at surroundings of the bulge portion;
the seat rail has:
a front flange positioned at an upper end, in an upper-lower direction of the vehicle body, of each of the side walls, the front flange protruding inward in the width direction of the vehicle body from an upper end, in the upper-lower direction of the vehicle body, of the bulge portion;
a rear flange positioned at the upper end, in the upper-lower direction of the vehicle body, of each of the side walls and positioned rearward in the vehicle body relative to the front flange; and
a transitional flange connecting the front flange and the rear flange;
the bracket is configured such that a seat and/or a fuel tank is attachable;
an upper surface, in the upper-lower direction of the vehicle body, of the front flange includes an attachment bearing surface used for attachment of the bracket;
a length, in the width direction of the vehicle body, of the front flange is greater than a length, in the width direction of the vehicle body, of the rear flange;
the transitional flange is positioned at the upper end of the bulge portion, and both side edges, in the width direction of the vehicle body, of the transitional flange are formed such that an interval, in the width direction of the vehicle body, between the both side edges is increased from the rear flange toward the front flange;
a front-end portion of the seat is attached to the attachment bearing surface of the upper surface of the front flange via the bracket located below the seat; and
a rear end portion of the seat is attached to a seat engaging member above the rear flange located below the rear end portion.

2. The seat rail structure for a motorcycle according to claim 1, wherein
the front flange supports a front-end portion, in a front-rear direction of the vehicle body, of the seat,
at the upper end, in the upper-lower direction of the vehicle body, of each of the side walls, the seat engaging member to be engaged with a rear end portion, in the front-rear direction of the vehicle body, of the seat, is disposed, and
a rear end, in the front-rear direction of the vehicle body, of the bulge portion is disposed frontward in the vehicle body relative to the seat engaging member.

3. The seat rail structure for a motorcycle according to claim 1, wherein
a front-end region, in the front-rear direction of the vehicle body, of each of the side walls has an upper attachment portion configured so as to be attached to a main frame of the vehicle body, the upper attachment portion positioned upward in the vehicle body, and
a lower end, in the upper-lower direction of the vehicle body, of the bulge portion is disposed downward in the vehicle body relative to an upper end, in the upper-lower direction of the vehicle body, of the upper attachment portion.

4. The seat rail structure for a motorcycle according to claim 1, wherein
the front-end region of each of the side walls has a lower attachment portion configured so as to be attached to a main frame of the vehicle body, the lower attachment portion positioned downward in the vehicle body, and
the lower end of the bulge portion is disposed upward in the vehicle body relative to the upper end, in the upper-lower direction of the vehicle body, of the lower attachment portion.

5. A seat rail structure for a motorcycle, comprising a seat rail disposed on a vehicle body of the motorcycle, wherein
the seat rail has a side wall positioned lateralward in a width direction of the vehicle body,
the side wall has a bulge portion formed at a front upper region positioned frontward in the vehicle body and upward in the vehicle body,
the bulge portion bulges outward in the width direction of the vehicle body relative to a peripheral portion positioned at surroundings of the bulge portion,
the seat rail has a front flange positioned at an upper end, in an upper-lower direction of the vehicle body, of the side wall, the front flange protruding inward in the width direction of the vehicle body from an upper end, in the upper-lower direction of the vehicle body, of the bulge portion, an outer panel covers the bulge portion from outward in the width direction of the vehicle body, and the side wall has an exposed portion adjacent to the bulge portion and the outer panel downward in the vehicle body, the exposed portion exposed to an exterior when seen from outward in the width direction of the vehicle body.

6. The seat rail structure for a motorcycle according to claim 1, wherein the front-end region, in the front-rear direction of the vehicle body, of each of the side walls has an upper attachment portion configured so as to be attached to a main frame of the vehicle body, the upper attachment portion positioned upward in the vehicle body, and a front end, in the front-rear direction of the vehicle body, of the bulge portion is disposed rearward in the vehicle body relative to the upper attachment portion.

7. The seat rail structure for a motorcycle according to claim 1, wherein the bulge portion has an outermost section positioned at an outermost of the bulge portion in the width direction of the vehicle body, and the outermost section is positioned downward in the vehicle body relative to the front flange.

8. The seat rail structure according to claim 1, wherein each of the side walls has a border edge formed downward in the vehicle body from the upper end, in the upper-lower direction of the vehicle body, of the side wall and between the bulge portion and the peripheral portion of the bulge portion, and a corner portion formed at the border edge, extends to be arcuate.

* * * * *